US008627099B2

(12) United States Patent
Kuo et al.

(10) Patent No.: US 8,627,099 B2
(45) Date of Patent: Jan. 7, 2014

(54) SYSTEM, METHOD AND COMPUTER PROGRAM PRODUCT FOR REMOVING NULL VALUES DURING SCANNING

(75) Inventors: Chengi J. Kuo, Manhattan Beach, CA (US); Federico Barbieri, San Donato Milanese (IL)

(73) Assignee: McAfee, Inc., Santa Clara, CA (US)

(*) Notice: Subject to any disclaimer, the term of this patent is extended or adjusted under 35 U.S.C. 154(b) by 1937 days.

(21) Appl. No.: 11/194,307

(22) Filed: Aug. 1, 2005

(65) Prior Publication Data

US 2013/0247199 A1    Sep. 19, 2013

(51) Int. Cl.
  *G06F 12/14* (2006.01)
  *G06F 11/00* (2006.01)
  *H04L 29/06* (2006.01)
  *H04L 9/32* (2006.01)
  *G08B 23/00* (2006.01)

(52) U.S. Cl.
  USPC ............ 713/188; 713/165; 713/168; 726/23; 726/25; 714/25

(58) Field of Classification Search
  USPC ....... 714/38, 25; 707/102; 717/126; 719/315; 726/22, 23, 25; 380/250; 713/165, 168, 713/188
  See application file for complete search history.

(56) References Cited

U.S. PATENT DOCUMENTS

| | | | |
|---|---|---|---|
| 4,346,440 A * | 8/1982 | Kyu et al. | 709/236 |
| 5,452,442 A * | 9/1995 | Kephart | 714/38.1 |
| 5,987,610 A | 11/1999 | Franczek et al. | |
| 6,073,142 A | 6/2000 | Geiger et al. | |
| 6,230,288 B1 * | 5/2001 | Kuo et al. | 714/38 |
| 6,401,097 B1 * | 6/2002 | McCotter et al. | 707/102 |
| 6,460,050 B1 | 10/2002 | Pace et al. | |
| 7,000,234 B1 * | 2/2006 | Shavit et al. | 719/315 |
| 7,398,553 B1 * | 7/2008 | Li | 726/22 |
| 7,506,155 B1 | 3/2009 | Stewart et al. | |
| 2005/0114840 A1 * | 5/2005 | Zeidman | 717/126 |
| 2005/0240393 A1 * | 10/2005 | Glosson | 704/8 |

OTHER PUBLICATIONS

R. Dennis Cook; Detection of Influential Observation in Linear Regression; Feb. 1977; Technometrics; vol. 19, pp. 1-5.*
E, Rahm; Data cleaning: Problems and current approaches; Year: 2000; IEEE Data Engineering Bulletin; pp. 1-11.*

* cited by examiner

*Primary Examiner* — Aravind Moorthy
(74) *Attorney, Agent, or Firm* — Patent Capital Group

(57) ABSTRACT

A system, method, and computer program product are provided for scanning data values. Initially, a set of data values are received. Null values between the data values are then removed such that the data values are contiguous. Further, the data values with the null values removed are scanned for the purpose of identifying unwanted data.

19 Claims, 5 Drawing Sheets

TITLE: SYSTEM, METHOD AND COMPUTER PROGRAM PRODUCT FOR REMOVING NULL VALUES DURING SCANNING

FIELD OF THE INVENTION

The present invention relates to computer security software, and more particularly to software for scanning data.

BACKGROUND

Unwanted data is generally a sequence of commands or instructions that interfere with a user's operation of, or cause damage to, his or her computer system. Such unwanted data may include viruses, Trojan horses, worms, spyware, and so forth. As an example, unwanted data may damage a computer system directly, such as by deleting files or formatting a disk, or indirectly, such as by altering system protective measures, thus making the computer vulnerable to probing or other attacks. Other types of unwanted data may simply inconvenience a user of a computer, for example, by displaying an unwanted political message in a dialogue box, tracking actions performed on the computer by such a user (e.g. tracking websites visited by a user, etc.), theft of personal information, etc.

Unwanted data therefore presents a significant threat to the integrity and reliability of computer systems and continues to present such a threat due to the interconnecting of computers (e.g. through networks, the Internet, etc.). The increase in computer-to-computer communications, via the Internet for example, has caused a commensurate increase in the spread of unwanted data because infected files are spread more easily and rapidly than ever before.

Detection of unwanted data is thus an essential element in the effective maintenance of computer systems. In order to detect unwanted data, a detection program is generally employed in conjunction with a series of "profiles" or "signatures" which represent characteristics or patterns of known unwanted data. One type of detection routine monitors a program suspected of being infected by unwanted data. The behavior of the program is compared to a profile of operating characteristics of known unwanted data and, if a match is found, the program is assumed to contain the unwanted data.

One solution for detecting unwanted data is set forth in U.S. Pat. No. 6,230,288.

SUMMARY

A system, method, and computer program product are provided for scanning data values. Initially, a set of data values are received. Null values between the data values are then removed such that the data values are contiguous. Further, the data values with the null values removed are scanned for the purpose of identifying unwanted data.

In one embodiment, it may be determined if a threshold is met before removing the null values. Such threshold may be indicative of a size of the set of data values. Accordingly, only a portion of the set of data values may be received if the set of data values is larger than the threshold. Still yet, the portion of the set of data values may only include the data values that are necessary for the scanning.

In another aspect of the present embodiment, the portion of the set of data values may be identified utilizing a key position. Such key position may be based on a virus signature associated with the scanning. Furthermore, after the null values are removed in a first portion of the set of data values, the first portion of the set of data values may be stored with the null values removed, and it may also be determined whether a second portion of the set of data values is to be received. In addition, after all of the portions of the set of data values are stored with the null values removed, all such portions may be scanned.

In yet another aspect of the present embodiment, an offset may be utilized for determining a location in the set of data values where the scanning is to start. The offset may optionally be based on a number of the null values located between a beginning of the portions of the set of data values, and the location where the scanning is to start. Additionally, a Global Regular Expression Print (GREP) function may be utilized for locating the offset. Even still, the offset may match the location where the scanning is to start, with a first portion of a virus signature.

In still yet another embodiment, it may be determined if the scanned data values include the unwanted data. As an option, a reaction may be initiated based on the determination. In one aspect, the scanned data values may be processed based on the determination.

DETAILED DESCRIPTION

Figure 1:
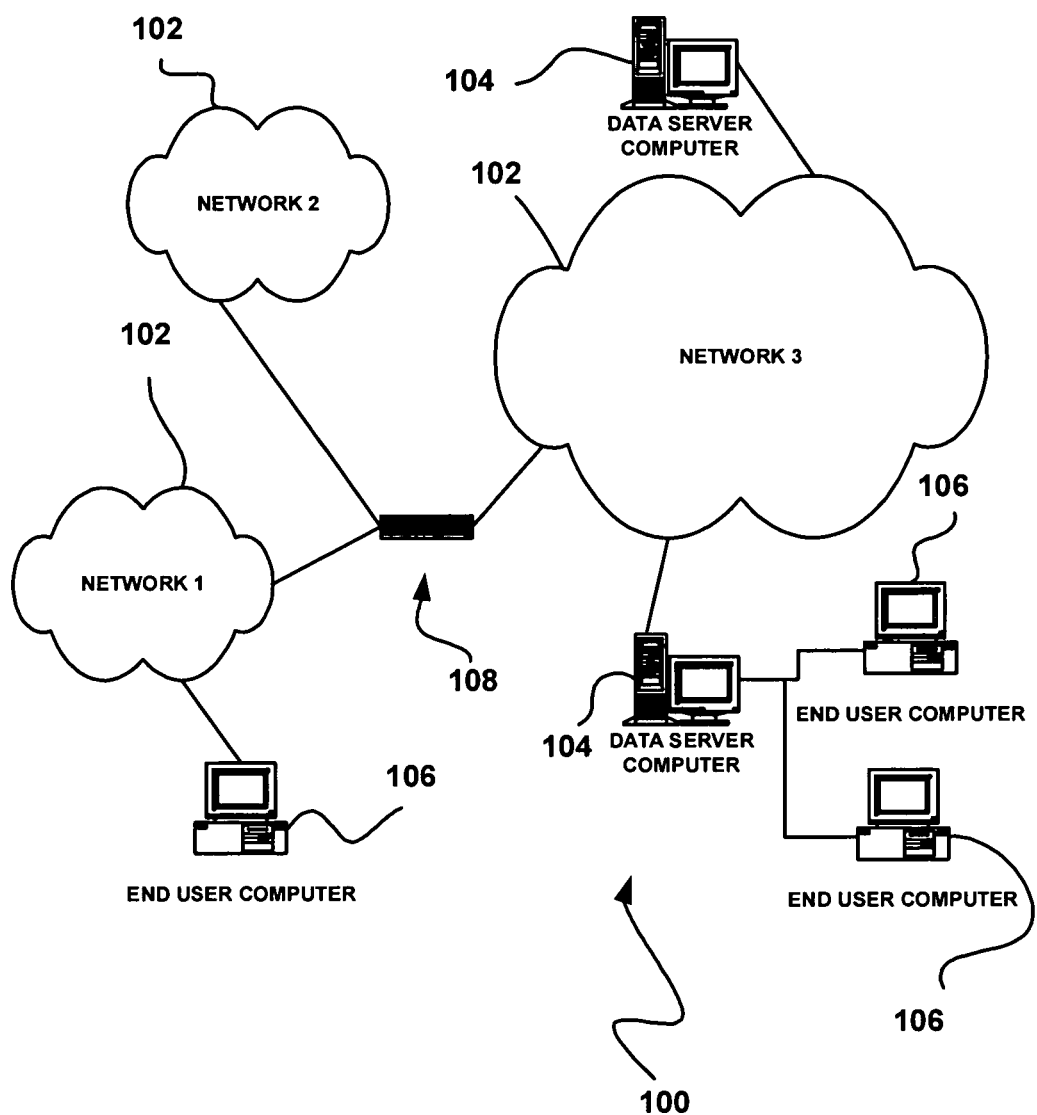
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, etc.

Coupled to the networks 102 are data server computers 104 which are capable of communicating over the networks 102. Also coupled to the networks 102 and the data server computers 104 is a plurality of end user computers 106. Such end user computers 106 may each include a desktop computer, lap-top computer, hand-held computer, mobile phone, any component of a computer, and/or any other type of logic. In order to facilitate communication among the networks 102, at least one gateway or router 108 is optionally coupled therebetween.

It should be noted that any of the foregoing computers in the present network architecture 100, as well as any other unillustrated hardware and/or software, may each be equipped with various scanning features. For example, the various data server computers 104 and/or end user computers 106 may be equipped with computer scanning hardware and/or software for scanning data located on the various computers on any of the networks 102. More information regarding optional functionality and architectural components associated with such feature will now be set forth for illustrative purposes.

Figure 2:
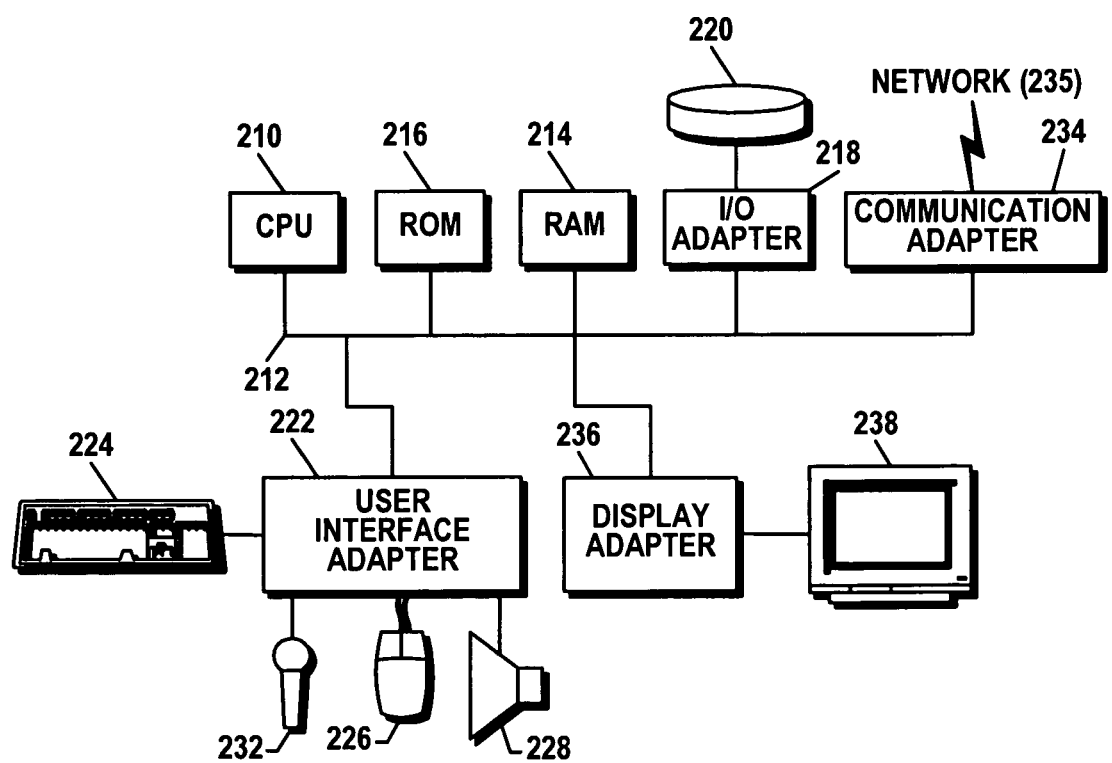
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g. a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
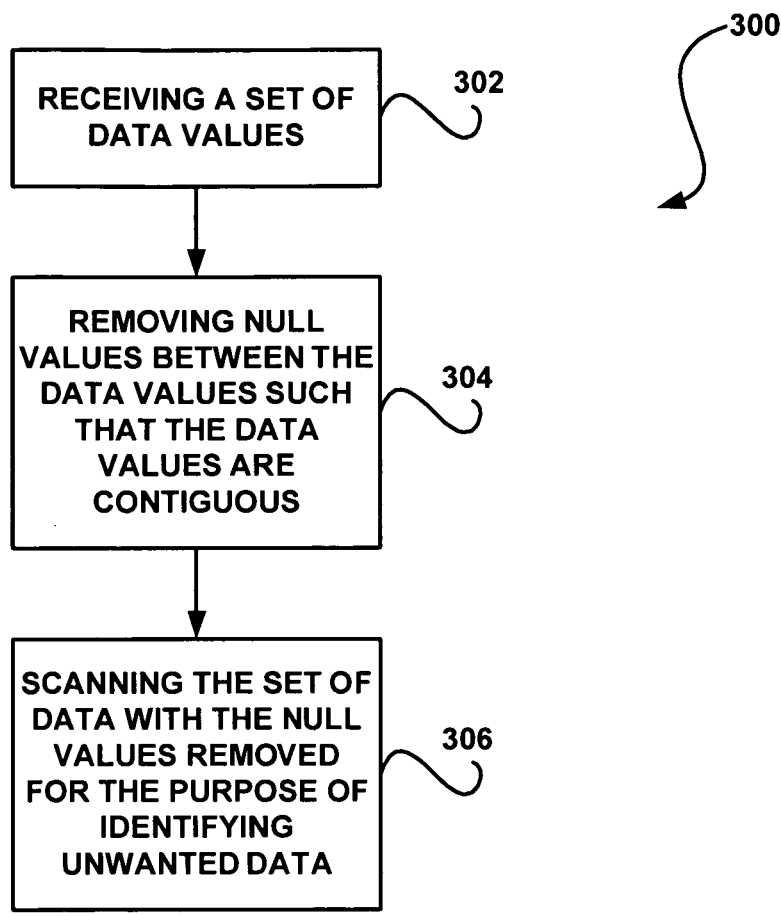
FIG. 3 shows a method for removing null values during scanning, in accordance with one embodiment.

FIG. 3 shows a method 300 for removing null values during scanning, in accordance with one embodiment. As an option, the present method 300 may be implemented in the context of the architecture and environment of FIGS. 1 and/or 2. Of course, however, the method 300 may be carried out in any desired environment.

As shown in operation 302, a set of data values is received. The set of data values may include Hypertext Markup Language (HTML), plain text, JavaScript, VBScript, and/or any other data and/or code capable of including null values, which will be described in further detail during reference to operation 304. The set of data values may also be received in the form of a file (e.g. text file, etc.). Further, such set of data values may be received at any device capable of receiving a set of data values. Just by way of example, the set of data values may be received at a computer, such as those described with reference to FIG. 1.

After the set of data values are received in operation 302, null values between the data values are removed such that the data values are contiguous, as depicted in operation 304. The null values may include a "\0" command, a binary 0, and/or any other data capable of representing a null value. Of course, null values located before a beginning data value in the set of data values and/or after an end data value in the set of data values may also optionally be removed.

Table 1 illustrates examples of sets of data values before and after removing the null values as described in operation 302. It should be noted that such examples are set forth for illustrative purposes only and should not be construed as limiting in any manner.

TABLE 1

| A. Text with null values: | H\0\0\0T\0M\0\0L |
| Text with null values removed: | HTML |

TABLE 1-continued

| B. Text with null values: | H\0T\0M\0L\0 |
| Text with null values removed: | HTML |

As an option, the set of data values with the null values removed may be temporarily stored, for example, in a temporary text file. After operation 304, the reconstructed data may be submitted to further preprocessing operations, if any. Of course, this is an option.

Further, after the null values are removed in operation 304, the set of data values with the null values removed are scanned for the purpose of identifying unwanted data, as in operation 306. The scanning may be performed by any scanning application capable of detecting unwanted data. Further, the scanning may be performed on the computer device receiving the set of data values in operation 302, or may be performed on any other computer device capable of receiving and scanning the set of data values with the null values removed.

Thus, a set of data values may be scanned for unwanted data in a more accurate and efficient manner. Specifically, unwanted data may be located even if a creator of the unwanted data attempts to circumvent detection techniques by adding null values to a set of data values. Furthermore, removing the null values may create a shorter set of data values to be scanned, thus lessening the time required to complete the scanning.

More illustrative information will now be set forth regarding various optional architectures and features with which the foregoing method 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
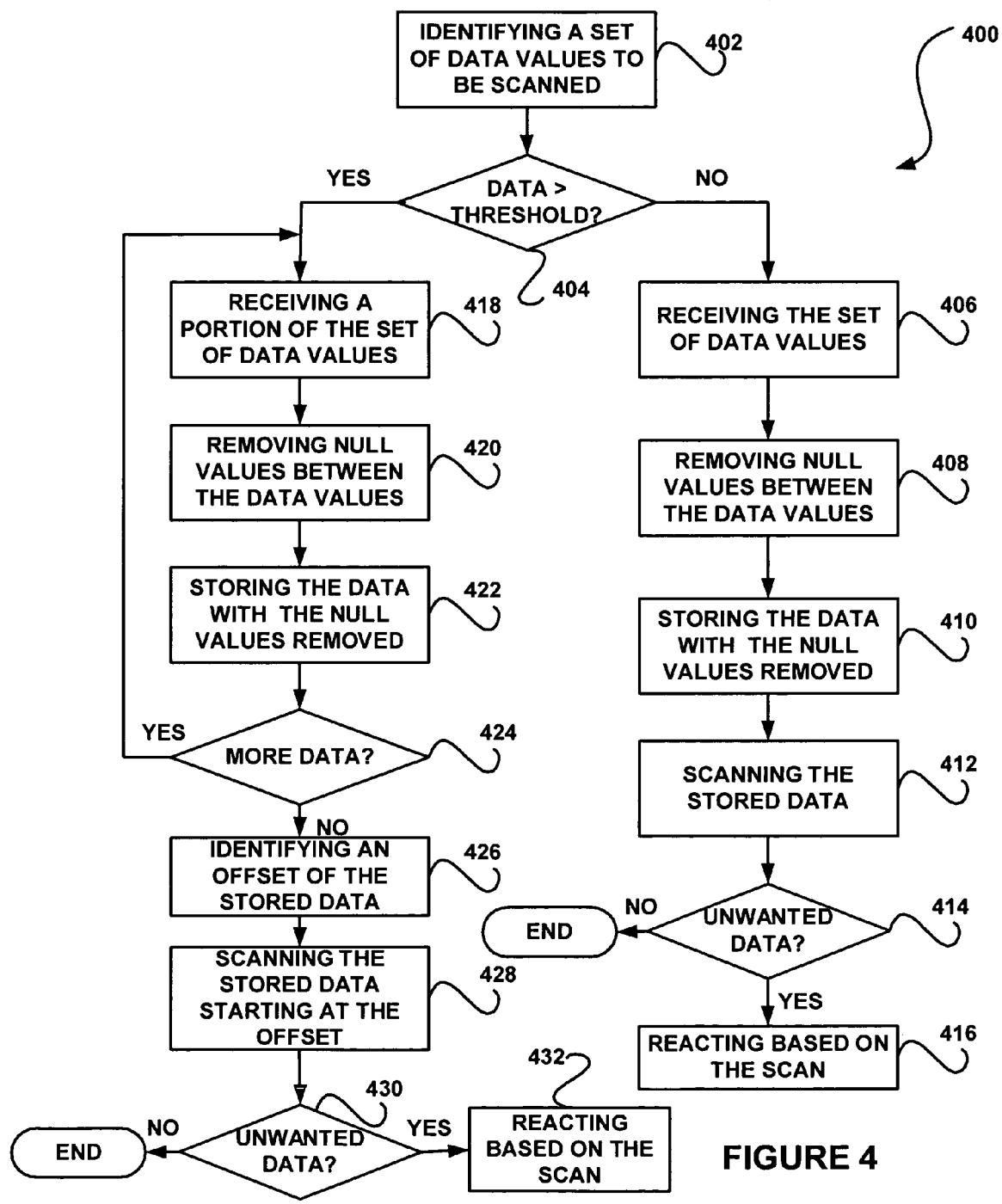
FIG. 4 shows a method for removing null values during scanning, in accordance with another embodiment.

FIG. 4 shows a method 400 for removing null values during scanning, in accordance with another embodiment. As an option, the present method 400 may be implemented in the context of the architecture and environment of FIGS. 1-3. Of course, however, the method 400 may be carried out in any desired environment. In addition, the definitions referred to with respect to the method 300 of FIG. 3 also apply in the context of the method 400 of FIG. 4.

As shown in operation 402, a set of data values to be scanned is identified. As described with reference to operation 302 of FIG. 3, such set of data values may include any data and/or code capable of including null values.

As an option, a database of signatures to be used in subsequent scanning may indicate that a particular unwanted data, or each unwanted data, must include at least a predetermined threshold amount of data (e.g. 20K). Thus, it may be determined at this point if the identified set of data values is at least the predetermined threshold amount, before any processing commences. If it is not, additional processing (e.g. scanning, etc.) is not necessary, and resources may be preserved. Further, after null values have been removed (as will soon be set forth), the revised data set size must again be more than the threshold. Again, if it is not, additional processing is not necessary.

Next, if it is determined in decision 404 that the set of data values is not larger than a pre-defined threshold [X (e.g. X=2, etc.) times an amount of associated signature(s)], the set of data values identified in operation 402 is received (see operation 406). Null values located between data values in the received set of data values of operation 406 are then removed, as shown in operation 408. The set of data values with the null values removed is then stored, as in operation 410. Such set of data values with the null values removed may be stored permanently or temporarily for a predetermined period of time, such as, for example, until after the stored set of data values is scanned. After operation 410, the reconstructed data may be submitted to further preprocessing operations, if any. Of course, this is an option.

Further, after the set of data values with the null values removed is stored in operation 410, such set of data values is then scanned for unwanted data, as illustrated in operation 412. If it is determined in decision 414 that the stored set of data values of operation 410 does include unwanted data, a reaction is initiated based on the scan (see operation 416). Such reaction may include quarantining or deleting the set of data values received in operation 406 and/or the set of data values stored in operation 410, notifying a user of the unwanted data, etc.

However, if it is determined in decision 414 that the stored set of data values of operation 410 does not include unwanted data, the set of data values received in operation 406 and/or the stored set of data values of operation 410 may optionally be subject to additional processing (e.g. opening/execution by a user/program, etc.).

The additional processing may, in one embodiment, include that described in U.S. Pat. No. 6,230,288, which is incorporated herein by reference, as an optional way of collapsing whitespace, etc. It should be noted that the additional processing described in U.S. Patent No. 6,230,288 may alternatively be performed prior to the operations of the method 400 of FIG. 4.

Thus, in one embodiment, null values may be removed, after which whitespace may be collapsed. Whitespace placing may be relevant, since HTML and scripting languages are typically driven by keywords. If all words or text are transformed together, the keyword may not exist, rendering the code inoperable. Further, detecting it as unwanted data may be erroneous. If the data values are received with null values interspersed, and whitespace strewn throughtout, the system may be able to process the related file, and execute any pertinent script. Therefore, in one embodiment, a collapsed baseline may be provided so all such data values look the same, from the point of view of a scanner, etc., so that one basic detection string, signature, schema, etc. may be able to detect unwanted data).

If, in decision 404, it is determined that the set of data values is larger than the pre-defined threshold [X (e.g. X=2, etc.) times an amount of associated signature(s)], only a portion of the set of data values identified in operation 402 may be received, as illustrated in operation 418. The portion of the set of data values may include any portion of the set of data values necessary for scanning. For example, such portion of the set of data values may include only data relevant to a signature utilized in association with a scanning of the set of data values. Additionally, the portion of the set of data values may be based on a maximum pre-defined size, such that only a specific amount of the set of data values may be received in operation 418.

Furthermore, the portion of the set of data values may be identified utilizing a key position. Such key position may be located in a database in association with a specific signature or may be located in any other desired manner. For example, the key position may be based on a virus signature associated with a scanning to be performed on the set of data values. In this way, a key position is capable of identifying a beginning of a portion of a set of data values, which may be relevant during scanning.

After the portion of the set of data values is received in operation 418, null values located between the data values are removed such that the data values are contiguous, as shown in operation 420. The portion of the set of data values is then stored in operation 422 after the null values are removed in operation 420. As described with respect to operation 410, such portion of the set of data values (with the null values removed) may be stored temporarily or permanently, as desired.

It is then determined in decision 424 whether another portion of the set of data values is to be received. The decision 424 may optionally be based on whether additional data values from the set of data values identified in operation 402 are needed for scanning. If it is determined in operation 424 that another portion of the set of data values is to be received, the method 400 returns to operation 418, where the next portion of the set of data values is received. In this way, a set of data values may be received portion-by-portion such that each portion is eradicated of null values and stored before a next portion is received. Of course, in other embodiments, each portion may be received prior to the null value removal.

Once it is determined in operation 424 that no further portions of the set of data values needs to be received, an offset of the stored set of data values is identified, as shown in operation 426. As an option, prior to operation 426 and after operation 424, the reconstructed data may be submitted to further preprocessing operations, if any.

The offset may be utilized for determining a location in the stored set of data values, where the scanning is to start. For example, the offset may be based on a number of the null values located between a first data value received in operation 418, and a location in the stored set of data values where the scanning is to start. Thus, the offset may map the location in the stored set of data values where the scanning is to start, with a first portion of a virus signature.

Utilizing the offset identified in operation 426, the stored set of data values, including all of the relevant portions of the set of data values from operation 422 are scanned beginning at the offset (see operation 428). A Global Regular Expression Print (GREP) function may optionally be utilized for locating the offset within the stored set of data values. It is then determined in decision 430 whether the scanned set of data values of operation 428 includes unwanted data. If it is determined in decision 430 that the stored set of data values of operation 422 does include unwanted data, a reaction is initiated based on the scan (see operation 432).

Examples of such reactions may include those described with reference to operation 416. However, if it is determined in decision 430 that the stored set of data values of operation 422 does not include unwanted data, the set of data values received in operation 418 and/or the stored set of data values of operation 422 may optionally be subject to additional processing.

Such additional processing was described in detail hereinabove. Specifically, the additional processing may, in one embodiment, include that described in U.S. Pat. No. 6,230,288, which is incorporated herein by reference, as an optional way of collapsing whitespace, etc. It should be noted that the additional processing described in U.S. Patent No. 6,230,288 may alternatively be performed prior to the operations of the method 400 of FIG. 4.

In this way, the method 400 allows for only the relevant portions of the set of data values (which need to be scanned) to be stored for scanning, and therefore limits the overall scanning time in operation 428. Specifically, in an example where an amount of an associated signature(s) is 20K and the pre-defined threshold from decision 404 is twice such size (i.e. 40K), the set of data values may be read starting at a point near the 20K mark, but not at the 20K mark. That is, one may be able to determine "into" the data sequence a position where the unwanted data may be found. This may possibly cause more processing time to determine the offset where the unwanted data may be found. However, disk access time costs more. Thus, time may be saved, in some embodiments.

Figure 5:
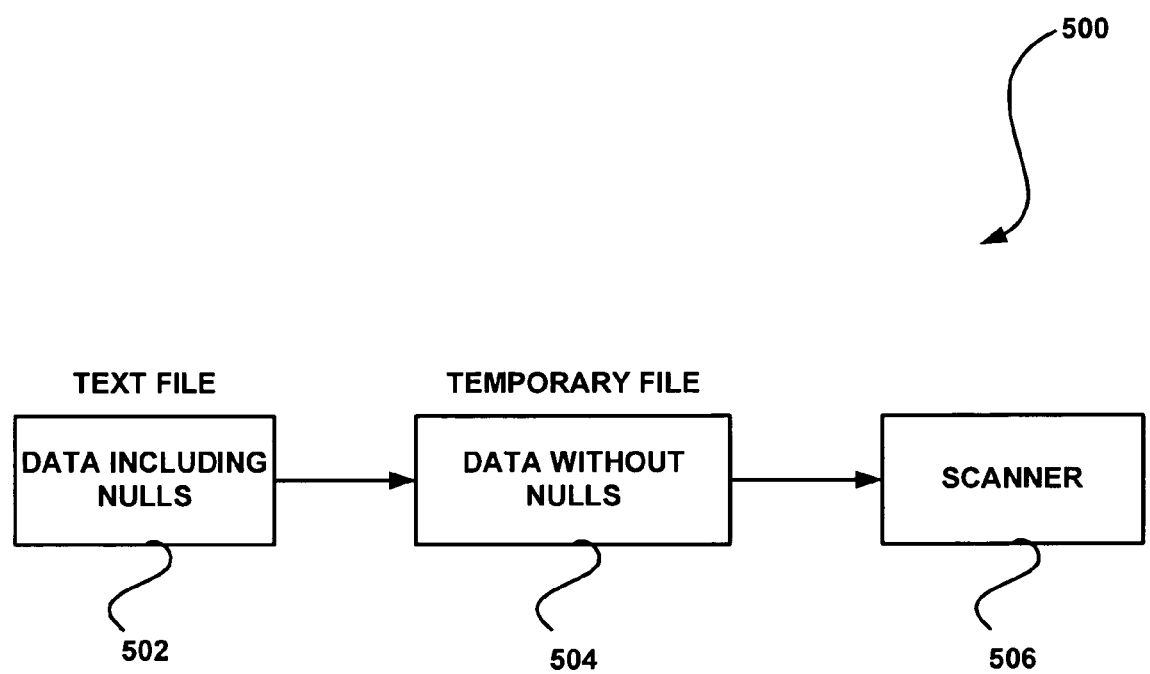
FIG. 5 shows a method for scanning a text file, in accordance with still yet another embodiment.

FIG. 5 shows a method 500 for scanning a text file, in accordance with still yet another embodiment. As an option, the present method 500 may be implemented in the context of the architecture and environment of FIGS. 1-4. Of course, however, the method 500 may be carried out in any desired environment. In addition, the definitions referred to with respect to the method 300 of FIG. 3 also apply in the context of the method 500 of FIG. 5.

As shown in operation 502, a text file including a set of data values and null values is identified. The null values in the set of data values of operation 502 are then removed and the resulting set of data values is stored in a temporary text file, as shown in operation 504. Finally, the temporary text file of operation 504 is sent to a scanner that scans the set of data values for unwanted data. See operation 506. As an option, after operation 504 and before operation 506, the reconstructed data may be submitted to further preprocessing operations, if any.

As a further option, null values within the signatures utilized in the scanning may also be removed such that only actual data values within the signatures may be compared against a set of actual data values in a temporary text file. Thus, the scanner is able to match signatures without null values, with a set of data that also does not include null values.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
   receiving a set of data values at a computer, which includes a processor;
   determining if a threshold is met before removing null values;
   removing the null values between the data values such that the data values are made contiguous and shorter;
   evaluating a size of the data values after the null values have been removed;
   scanning the set of data values with the null values removed to identify unwanted data in the computer, wherein an offset is utilized for determining a location in the set of data values where the scanning is to start, and wherein the offset matches the location in the set of data values with a first portion of a virus signature; and
   collapsing at least a portion of whitespace within text-based files corresponding to the set of data values such that certain sequences of whitespace characters are replaced by a single whitespace character.

2. The method of claim 1, wherein the threshold includes a size of the set of data values.

3. The method of claim 1, wherein only a portion of the set of data values is received if the set of data values is larger than the threshold.

4. The method of claim 3, wherein the portion of the set of data values only includes the data values that are necessary for the scanning.

5. The method of claim 4, wherein, after the null values are removed in a first portion of the set of data values, the first portion of the set of data values is stored with the null values removed, and it is determined whether a second portion of the set of data values is to be received.

6. The method of claim 5, wherein, after the portions of the set of data values are stored with the null values removed, the portions of the set of data values are scanned.

7. The method of claim 3, wherein the portion of the set of data values is identified utilizing a key position.

8. The method of claim 7, wherein the key position is based on a virus signature associated with the scanning.

9. The method of claim 1, wherein the offset is based on a number of the null values located between a beginning of the portions of the set of data values and the location in the set of data values where the scanning is to start.

10. The method of claim 9, wherein a Global Regular Expression Print (GREP) function is utilized for locating the offset.

11. The method of claim 1, further comprising determining if the scanned set of data values includes the unwanted data.

12. The method of claim 11, further comprising reacting, based on the determination.

13. The method of claim 11, further comprising processing the scanned set of data values, based on the determination.

14. The method of claim 1, further comprising:
   determining if a size of the set of data values exceeds a the threshold after removing the null values from the set of data values;
   wherein the scanning is only performed in response to a determination that the size of the set of data values exceeds the threshold.

15. The method of claim 1, wherein the set of data values with the null values removed is permanently stored.

16. The method of claim 1, wherein the threshold is predefined as two times an amount of virus signatures associated with the scanning.

17. The method of claim 1, wherein the offset is determined after it is determined that there are no additional portions of the set of data values to be received.

18. A computer program product embodied on a non-transitory computer readable medium, comprising:
   receiving a set of data values at a computer, which includes a processor;
   determining if a threshold is met before removing null values;
   removing the null values between the data values such that the data values are made contiguous and shorter;
   evaluating a size of the data values after the null values have been removed;
   scanning the set of data values with the null values removed to identify unwanted data in the computer, wherein an offset is utilized for determining a location in the set of data values where the scanning is to start, and wherein the offset matches the location in the set of data values with a first portion of a virus signature; and
   collapsing at least a portion of whitespace within text-based files corresponding to the set of data values such that certain sequences of whitespace characters are replaced by a single whitespace character.

19. A system, comprising:
   memory coupled to a processor via a bus; and
   a processor, wherein the system is configured to:

receive a set of data values at a computer, which includes a processor;
determine if a threshold is met before removing null values;
remove the null values between the data values such that the data values are made contiguous and shorter;
evaluate a size of the data values after the null values have been removed;
scan the set of data values with the null values removed to identify unwanted data in the computer, wherein an offset is utilized for determining a location in the set of data values where the scanning is to start, and wherein the offset matches the location in the set of data values with a first portion of a virus signature; and
collapse at least a portion of whitespace within text-based files corresponding to the set of data values such that certain sequences of whitespace characters are replaced by a single whitespace character.

* * * * *